United States Patent
Madaiah et al.

(10) Patent No.: US 9,119,184 B2
(45) Date of Patent: Aug. 25, 2015

(54) METHOD AND SYSTEM OF TRANSMITTING A BEARER RESOURCE REQUEST MESSAGE FROM A UE TO A MME FOR SETTING UP AN EPS BEARER IN A LTE NETWORK

(71) Applicant: TEJAS NETWORKS LIMITED, Bangalore, Karnataka (IN)

(72) Inventors: Vinod Kumar Madaiah, Karnataka (IN); Sanil R C, Karnataka (IN); Rohit Kumar, Karnataka (IN)

(73) Assignee: Tejas Networks Limited (IN)

( * ) Notice: Subject to any disclaimer, the term of this patent is extended or adjusted under 35 U.S.C. 154(b) by 0 days.

(21) Appl. No.: 13/853,973

(22) Filed: Mar. 29, 2013

(65) Prior Publication Data

US 2013/0260774 A1    Oct. 3, 2013

(51) Int. Cl.
| | |
|---|---|
| *H04W 72/00* | (2009.01) |
| *H04W 72/04* | (2009.01) |
| *H04W 74/08* | (2009.01) |
| *H04W 76/02* | (2009.01) |
| *H04W 84/04* | (2009.01) |

(52) U.S. Cl.
CPC .......... *H04W 72/04* (2013.01); *H04W 74/0833* (2013.01); *H04W 76/022* (2013.01); *H04W 84/047* (2013.01)

(58) Field of Classification Search
None
See application file for complete search history.

(56) References Cited

U.S. PATENT DOCUMENTS

| 8,279,835 | B2 * | 10/2012 | Sun et al. | 370/331 |
| 2007/0097945 | A1 * | 5/2007 | Wang et al. | 370/349 |
| 2010/0260096 | A1 * | 10/2010 | Ulupinar et al. | 370/315 |
| 2012/0140701 | A1 * | 6/2012 | Huang | 370/315 |
| 2012/0202491 | A1 * | 8/2012 | Fox et al. | 455/435.1 |

* cited by examiner

*Primary Examiner* — Charles Appiah
*Assistant Examiner* — Margaret G Mastrodonato
(74) *Attorney, Agent, or Firm* — Merchant & Gould P.C.

(57) ABSTRACT

The present invention relates to a method and system of transmitting a bearer resource request message from a UE over a plurality of relay node to a mobility management entity for setting up an EPS bearer in an LTE Network. In one embodiment this is accomplished by receiving the bearer resource request message at the MME_UE from the UE, wherein the bearer resource request message is corresponding to the UE's original bearer resource request, inspecting the received message by the MME_UE and thereby creating bearer resource request for the plurality of MME of relay nodes, wherein the MMEs are identified by the Relay Node IDs, broadcasting the bearer resource request to all MME_RN corresponding to the relay nodes by the MME_UE and collating the responses received from all the MME_RN's, such that UE's EPS bearer can be admitted and thereby forwarding the response as an S1-AP message towards UE and RNs.

14 Claims, 3 Drawing Sheets

METHOD AND SYSTEM OF TRANSMITTING A BEARER RESOURCE REQUEST MESSAGE FROM A UE TO A MME FOR SETTING UP AN EPS BEARER IN A LTE NETWORK

This application claims benefit of Serial No. 1284/CHE/2012, filed 31 Mar. 2012 in India and which application is incorporated herein by reference. To the extent appropriate, a claim of priority is made to the above disclosed application.

FIELD OF THE INVENTION

The invention generally relates to wireless communications, and more particularly to setting up an evolved packet system (EPS) bearer by transmitting a bearer resource request message from a user equipment (UE) to a mobility management entity (MME) over a plurality of relay nodes (RNs) in a long term evolution (LTE) network.

BACKGROUND OF THE INVENTION

User equipment (UE) or a user terminal may operate in a wireless communication network that provides high-speed data communications using various network configurations and/or Radio Access Technologies (RATs). For example, the UE may operate in accordance with Global System for Mobile Communications (GSM) and General Packet Radio Service (GPRS) technologies. Today, such a UE may further operate in accordance with Enhanced Data rates for GSM Evolution (EDGE), or Enhanced GPRS (EGPRS) or Enhanced GPRS Phase 2 (EGPRS2). Other wireless networks that UEs may operate include but are not limited to CDMA, UMTS, E-UTRAN, WiMax, and WLAN (e.g. IEEE 802.11). UEs may also operate in fixed network environments such as xDSL, DOCSIS cable networks, Ethernet or optical networks. Some UEs may be capable of multimode operation where they can operate on more than one access network technology either on a single access network technology at a time or in some devices using multiple access network technologies simultaneously.

In wireless telecommunications systems, transmission equipment in a base station (BS) transmits signals throughout a geographical region known as a cell. As technology has evolved, more advanced equipment has been introduced that can provide services that were not possible previously. This advanced equipment might include, for example, an evolved universal terrestrial radio access network (E-UTRAN) node B (eNB) rather than a base station or other systems and devices that are more highly evolved than the equivalent equipment in a traditional wireless telecommunications system. Such advanced or next generation equipment may be referred to herein as long-term evolution (LTE) equipment, and a packet-based network that uses such equipment can be referred to as an evolved packet system (EPS). As used herein, the term "access device" may refer to any component, such as a traditional base station, eNB, or other LTE access device, that can provide a UE with access to other components in a telecommunications system.

In some deployment scenario, a UE is connected to a core network via plurality of Relay Nodes and eNodeB. The UE making a request to the MME, lets say MME_UE, for setting up an EPS Bearer in order to start the communication. The EPS Bearer request arrives at the MME; this MME could be of the UE or of one of the Relay Nodes.

In order for the UE to get an EPS bearer, all Relay nodes must have their own EPS bearers that have sufficient resources to admit EPS bearer connection of the UE, if RN has sufficient resources then MME_RN will not provision additional resources and if RN does not have sufficient resources then MME_RN will provision additional resources by responding to the request either directly to RN or to MME_UE.

The MME who received the EPS bearer request corresponding to the UE will have to optimally send EPS bearer request to MME of the Relay Nodes on behalf of the Relay Nodes also.

Thus, whenever a UE bearer is created or modified, the RN bearer modify or create procedures may be initiated by the RN. This increases the exchange of messages separately for the UE and for the RN to modify/create a new bearer. Thus additional messages may be exchanged by the RN each time a bearer is created/modified for the UE, leading to delayed access service as well as wasted or underutilized backhaul bandwidth.

Thus there is a need for an efficient method and system of transmitting a bearer resource request message from a UE over a plurality of relay nodes of a mobility management entity for setting up an EPS bearer in an LTE Network.

SUMMARY OF THE INVENTION

An aspect of the present invention is to address at least the above-mentioned problems and/or disadvantages and to provide at least the advantages described below.

Accordingly, an aspect of the present invention is to provide a method of transmitting a bearer resource request message from a UE over a plurality of relay nodes to a mobility management entity for setting up an EPS bearer in an LTE Network, the method comprising: receiving the bearer resource request message at the MME_UE from the UE, wherein the bearer resource request message is corresponding to the UE's original bearer resource request, inspecting the received message by the MME_UE and thereby creating bearer resource request for the plurality of MME of relay nodes, wherein the MMEs are identified by the Relay Node identifications (IDs), broadcasting the bearer resource request to all MME_RN corresponding to the relay nodes by the MME_UE and collating the responses received from all the MME_RN's, such that UE's EPS bearer can be admitted and thereby forwarding the response as an S1-application protocol (S1-AP) message towards the UE and the RNs.

Another aspect of the present invention is to provide a system of transmitting a bearer resource request message from a UE over a plurality of relay nodes to a mobility management entity for setting up an EPS bearer in a LTE Network, the system comprising: at least one UE, a plurality of Relay Nodes, at least one enodeB and a mobile management entity including a processor configured for receiving the bearer resource request message at the MME_UE from the UE, wherein the bearer resource request message is corresponding to the UE's original bearer resource request, inspecting the received message by the MME_UE and thereby creating bearer resource request for the plurality of MME of relay nodes, wherein the MME of relay nodes are identified by the Relay Node IDs, broadcasting the bearer resource request to all MME_RN corresponding to the relay nodes by the MME_UE and collating the responses received from all the MME_RN's, such that UE's EPS bearer can be admitted and thereby forwarding the response as an S1-AP message towards UE and RNs.

In another aspect of the present invention is to provide a node, comprising a processor including a memory and a network protocol module coupled to the processor, wherein the processor is configured for: receiving the bearer resource request message at the MME_UE from the UE, wherein the bearer resource request message is corresponding to the UE's original bearer resource request, inspecting the received message by the MME_UE and thereby creating bearer resource request for the plurality of MME of relay nodes, wherein the MME of relay nodes are identified by the Relay Node IDs, broadcasting the bearer resource request to all MME_RN corresponding to the relay nodes by the MME_UE and collating the responses received from all the MME_RN's, such that UE's EPS bearer can be admitted and thereby forwarding the response as an S1-AP message towards UE and RNs.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings in which.

Figure 1:
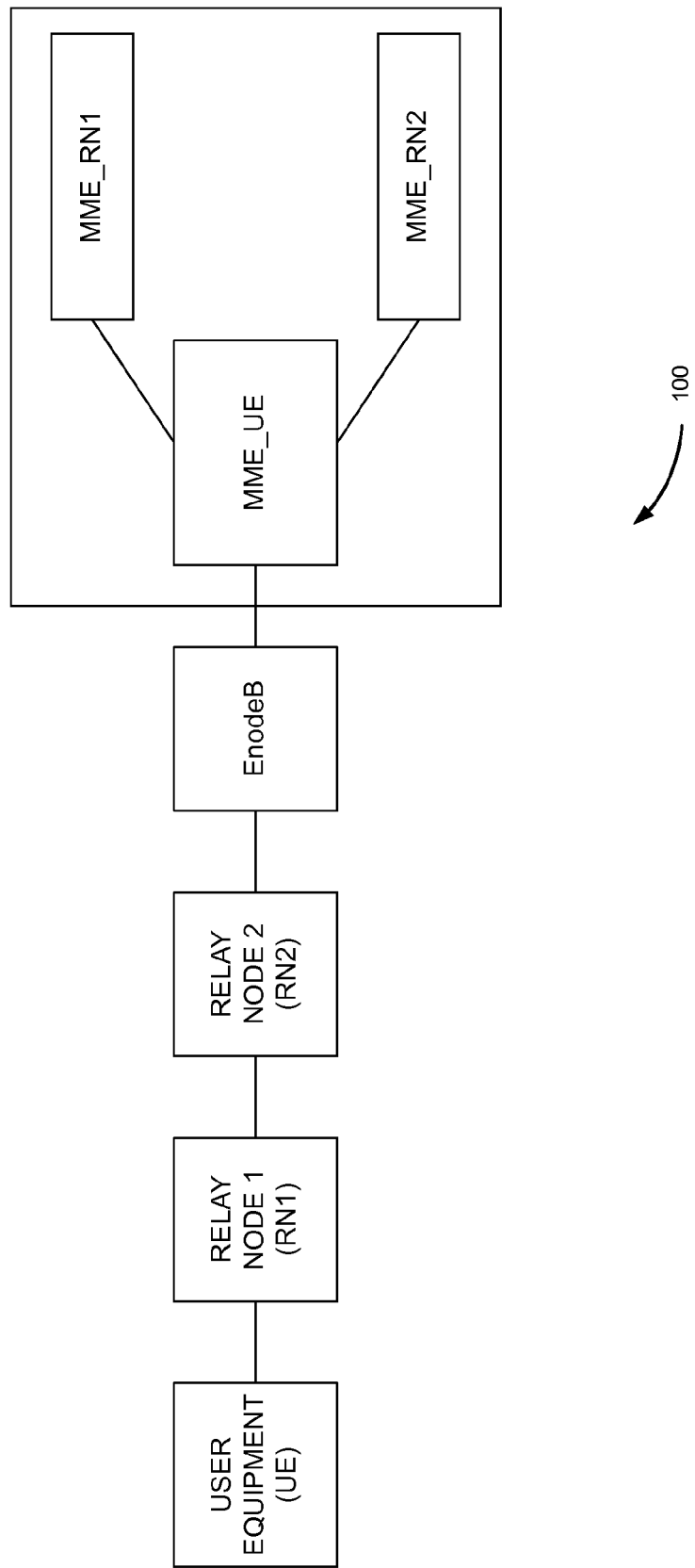
FIG. 1 is a block diagram of a system of transmitting a bearer resource request message from a UE over a plurality of relay nodes to a mobility management entity for setting up an EPS bearer in a LTE Network according to the present invention.

Persons skilled in the art will appreciate that elements in the figures are illustrated for simplicity and clarity and may have not been drawn to scale. For example, the dimensions of some of the elements in the figure may be exaggerated relative to other elements to help to improve understanding of various exemplary embodiments of the present disclosure.

DETAIL DESCRIPTION OF THE INVENTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

FIGS. 1 through 4, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to an eNodeB, a site controller, an access point (AP), or any other type of interfacing device capable of operating in a wireless environment.

While the present invention will be described fully hereinafter with reference to the accompanying drawings, in which particular embodiments are shown, it is to be understood at the outset that persons skilled in the art may modify the embodiments herein described while still achieving the desired result of this invention. Accordingly, the description which follows is to be understood as a broad informative disclosure directed to persons skilled in the appropriate arts and not as limitations of the present invention.

FIG. 1 is a block diagram of a system of transmitting a bearer resource request message from a UE over a plurality of relay nodes to a mobility management entity for setting up an EPS bearer in a LTE Network according to the present invention. As shown in figure system 100 includes a User Equipment (UE), one or more Relay Nodes (RNs), enodeB, and a Mobile Management Entity (MME). In an operation, the Mobile Management Entity (MME) pool receives a bearer resource request message at the MME_UE from one of the User Equipment (UE) within the geographical range of the serving enodeB. The bearer resource request message is corresponding to the UE's original bearer resource request. The received bearer resource request message may first communicate to a serving Relay Node (RN) or Relay Nodes (RNs) if any. In the present example, there are two relay nodes (RN) i.e. tandem relay nodes which are serving the UE in order to communicate to the EPC via an enodeB i.e. Donor enodeB. The bearer resource request message which is originated at the UE has to pass through all the tandem node i.e. Relay Nodes, Donor enodeB and further to the Mobile Management Entity.

During the request process originated from the UE for the bearer resource request, all the relay nodes through the path add a unique identifier (example: Relay Node ID or RN_ID1, RN_ID2 etc).

The MME, inspects the received message originated at the UE, let's say by the MME_UE. Further, the MME_UE has to create bearer resource request for the tandem relay nodes, where the relay nodes are identified by the Relay Node IDs. Since, the MME_UE has to check and create bearer resource for all the Relay Nodes or tandem Relay Nodes in order to respond to the original resource request which is originated at the UE, the MME_UE broadcasts or transmits the bearer resource request to all MME_RN corresponding to the relay nodes, whose RN_ID are attached as a tag to the requested message. The broadcasting includes multicast, multiple unicast forwarding, etc. The broadcasting of request is to inform all the MME_RNs about the creation of bearer resource request for all relay nodes (RNs) which are identified by the Relay Node ID i.e. RN_ID. The MME_UE waits for bearer resource responses from all the MME_RNs.

Upon receipt of the responses by all the MME_RNs, the MME_UE collates the responses received from all the MME_RN's. The responses are pooled at MME_UE such that UE's EPS bearer can be admitted and thereby forwarding the response as an S1-AP message towards UE and RNs.

Figure 2:
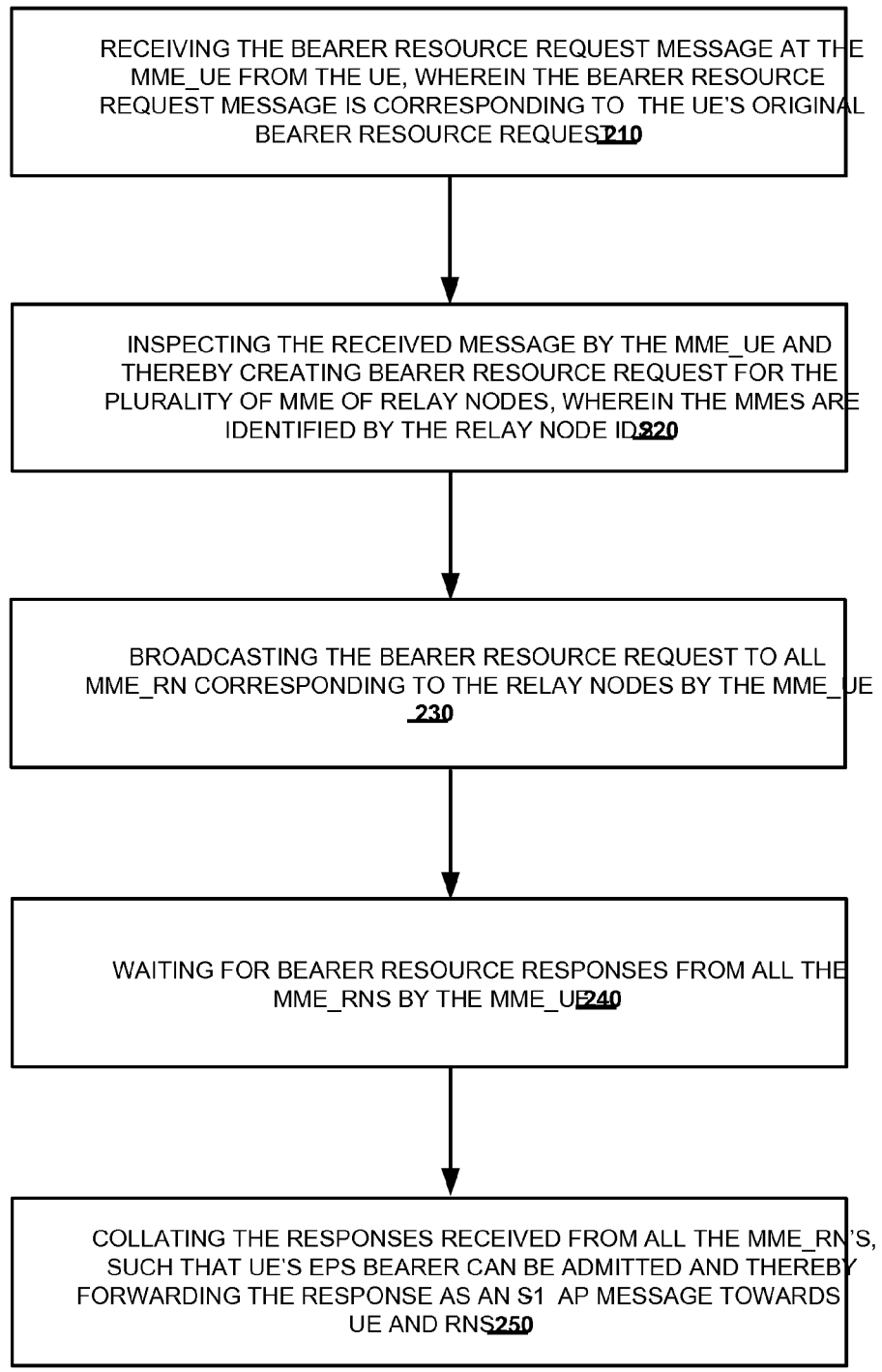
FIG. 2 is a flow chart of a method of transmitting a bearer resource request message from a UE over a plurality of relay nodes to a mobility management entity for setting up an EPS bearer in an LTE Network, according to one embodiment of the present invention.

FIG. 2 is a flow chart of a method 200 of transmitting a bearer resource request message from a UE over a plurality of relay nodes to a mobility management entity for setting up an EPS bearer in an LTE Network, according to one embodiment of the present invention.

At step 210, the method 200 receives the bearer resource request message at the MME_UE from the UE, where the bearer resource request message is corresponding to the UE's original bearer resource request. The received bearer resource request message includes bearer resource request for the UE and the relay node IDs.

At step 220, the method 200 inspects the received message by the MME_UE and thereby creating bearer resource request for the plurality of MME of relay nodes, wherein the MMEs are identified by the Relay Node IDs. The relay nodes IDs are encapsulated in the UE resource request message to MME.

At step 230, the method 200 broadcasts the bearer resource request to all MME_RN corresponding to the relay nodes by the MME_UE.

At step 240, the method 200 waits for bearer resource responses from all the MME_RNs by the MME_UE.

At step 250, the method 200 collates the responses received from all the MME_RN's, such that UE's EPS bearer can be admitted and thereby forwarding the response as an S1-AP message towards UE and RNs.

Although the method 200 flowchart includes steps 210-250 that are arranged logically in the exemplary embodiments, other embodiments of the subject matter may execute two or more steps in parallel, using multiple processors or a single processor organized as two or more virtual machines or sub-processors. Moreover, still other embodiments may implement the steps as two or more specific interconnected hardware modules with related control and data signals communicated between and through the modules, or as portions of an application-specific integrated circuit. Thus, the exemplary process flow diagrams are applicable to software, firmware, and/or hardware implementations.

Figure 3:
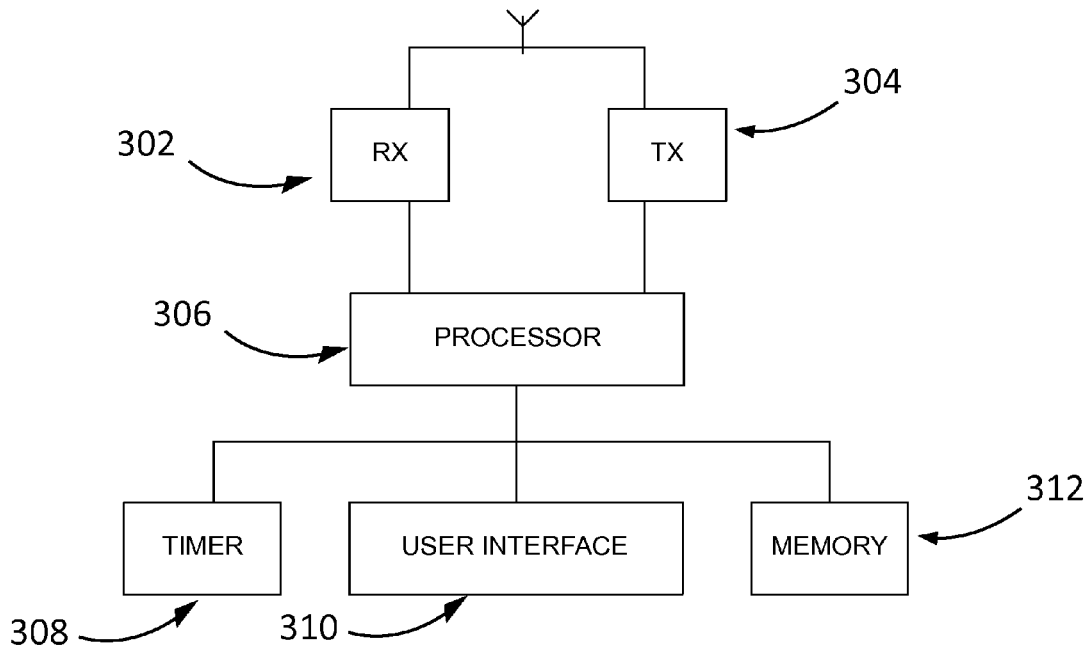
FIG. 3 is a block diagram of a user equipment of FIG. 1 in accordance with an embodiment of the present invention.

Referring now to FIG. 3, a block diagram of user equipment (UE) is provided in accordance with an embodiment of the present invention. UE includes a processor 306, such as one or more microprocessors, microcontrollers, digital signal processors (DSPs), combinations thereof or such other devices known to those having ordinary skill in the art, which processor is configured to execute the functions described herein as being executed by the UE. The UE further includes an at least one memory device 312, such as random access memory (RAM), dynamic random access memory (DRAM), and/or read only memory (ROM) or equivalents thereof, that is coupled to the processor 308 and that maintains data and programs that may be executed by the associated processor 308 and that allows the UE to perform all functions necessary to operate in communication system.

UE further includes a user interface 310 and timer 308 coupled to processor 306. User interface 310 provides a user of the UE with the capability of interacting with the UE, including inputting instructions into the UE and receiving audio, textual, and video messaging from the UE. In one embodiment of the present invention, user interface 310 may include an audio speaker, an audio receiver, a display screen, and a keypad that includes multiple keys that may be used by a user of a main stations (MS) to input instructions into the MS. In another embodiment of the present invention, the display screen may comprise a touch screen. Timer 308 is used by processor to count down an access time period so that the processor 306 can determine an amount of time remaining in an access time period and can display the remaining amount of time on user interface 310. UE also includes a radio frequency (RF) receiver (Rx) 302 and an RF transmitter (Tx) 304. RF receiver 302 and transmitter 304 are each coupled to processor 306 and an antenna and function to exchange RF signals with base stations (BSs) serving the UE via a corresponding air interface.

Figure 4:
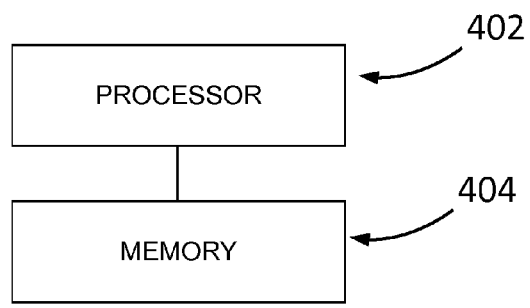
FIG. 4 is a block diagram of a Mobility Management Entity of FIG. 1 in accordance with an embodiment of the present invention.

FIG. 4 is a block diagram of MME in accordance with an embodiment of the present invention. MME include a processor 402, such as one or more microprocessors, microcontrollers, digital signal processors (DSPs), combinations thereof or such other devices known to those having ordinary skill in the art, which processor is configured to execute the functions described herein as being executed by the MME. MME further include an at least one memory device 404 that may comprise random access memory (RAM), dynamic random access memory (DRAM), and/or read only memory (ROM) or equivalents thereof, that maintain data and programs that may be executed by the associated processor and that allow the MME to perform all functions necessary to operate in communication system.

At least one memory device 404 further maintains a profile for each UE, served by, and registered with, the MME, which profile includes the capabilities of the UE. For example, when a UE registers with, that is, attaches to, network, the UE may convey its capabilities to MME or the MME may retrieve the UE's capabilities from a Home Subscriber Server (HSS) (not shown), a Home Location Register (HLR) (not shown), or Visited Location Register (VLR) (not shown) that maintains such information.

It should also be understood that elements of the present invention may also be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. For example, elements of the present invention may be downloaded as a computer program product, wherein the program may be transferred from a remote computer or telephonic device to a requesting process by way of data signals embodied in a carrier wave or other propagation medium via a communication link (e.g., a modem or network connection).

FIGS. 1-4 are merely representational and are not drawn to scale. Certain portions thereof may be exaggerated, while others may be minimized. FIGS. 1-4 illustrate various embodiments of the invention that can be understood and appropriately carried out by those of ordinary skill in the art.

In the foregoing detailed description of embodiments of the invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus, the following claims are hereby incorporated into the detailed description of embodiments of the invention, with each claim standing on its own as a separate embodiment.

It is understood that the above description is intended to be illustrative, and not restrictive. It is intended to cover all alternatives, modifications and equivalents as may be included within the spirit and scope of the invention as defined in the appended claims. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively.

We claim:

1. A method of transmitting a bearer resource request message from a user equipment (UE) to a mobility management entity (MME) for setting up an evolved packet system (EPS) bearer in a long term evolution (LTE) network, the method comprising:
   receiving the bearer resource request message at the mobile management entity from the UE, wherein the bearer resource request message is corresponding to the UE's original bearer resource request, wherein the bearer resource request message is propagated to the mobile management entity by a plurality of relay nodes, each of the plurality of relay nodes through a path to the mobile management entity being configured to attach a tag comprising a relay node identifier to the bearer resource request message;
   inspecting the received bearer resource request message by the mobile management entity, wherein inspecting the received bearer resource request message comprises determining, from the attached tags, the relay node identifier for each of the plurality of relay nodes involved in the propagation of the original bearer resource request message to the mobile management entity;
   creating a new bearer resource request for the plurality of relay nodes, wherein the plurality of relay nodes are identified by the determined relay node identifications;
   multicasting the created new bearer resource request message to the plurality of relay nodes;
   receiving responses from each of the plurality of relay nodes for the multicasted new bearer resource request message; and
   collating the responses received from the plurality of relay nodes;
   admitting the user equipment to the long term evolution (LTE) network based on the collated responses; and,
   forwarding a response for the original bearer resource request as an S1 application part (S1-AP) message to the UE and the plurality of relay nodes.

2. A system of transmitting a bearer resource request message from a user equipment (UE) over a plurality of relay nodes to a mobility management entity for setting up an evolved packet system (EPS) bearer in a long term evolution (LTE) Network, the system comprising:
   a plurality of Relay Nodes; and
   a mobile management entity configured for:
      receiving the bearer resource request message from the user equipment, wherein the bearer resource request message is corresponding to an original bearer resource request generated by the user equipment, wherein the bearer resource request message is propagated to the mobile management entity by the plurality of relay nodes relayed from the user equipment, each of the plurality of relay nodes through a path to the mobile management entity configured to attach a tag to the bearer resource request message, the tag comprising a relay node identifier (ID);
      inspecting the received bearer resource request message by the mobile management entity, wherein inspecting the received the bearer resource request message comprises determining, by inspecting the attached tags, the relay node identifier for each of the plurality of relay nodes involved in propagation of the original bearer resource request message to the mobile management entity;
      creating a new bearer resource request message for the plurality of relay nodes determined from the inspection of the received bearer resource request, wherein the plurality of relay nodes are identified by the relay node identifier;
      multicasting the created new bearer resource request message to the plurality of relay nodes by the mobile management entity;
      receiving responses from each of the plurality of relay nodes for the multicasted new bearer resource request message;
      collating the responses received from the plurality of relay nodes;
      admitting the user equipment to the long term evolution network based on the collated responses; and
      forwarding, upon admitting the user equipment, a response for the original bearer resource request as an S1 application part (S1-AP) message to the user equipment and the plurality of relay nodes.

3. A mobile management entity comprising
   a processor including a memory; and
   a network protocol module coupled to the processor, wherein the processor is configured for:
      receiving a bearer resource request message from a user equipment, wherein the bearer resource request message is corresponding to an original bearer resource request, wherein the original bearer resource request is propagated to the mobile management entity by a plurality of relay nodes of a network, wherein each of the plurality of relay nodes is configured to attach a tag in the original bearer resource request, the tag comprising a relay node identifier;

inspecting the received bearer resource request message by the mobile management entity, wherein the processor being configured for inspecting the received bearer resource request message comprises the processor being configured for determining, by inspecting the attached tags, relay node identifiers (IDs) for each of the plurality of relay nodes involved in propagation of the original bearer resource request message to the mobile management entity;

creating a new bearer resource request for the plurality of relay nodes determined from the inspection of attached tags, wherein the plurality of relay nodes are identified by relay node identifiers;

multicasting the created new bearer resource request message to the plurality of relay nodes;

receiving responses from each of the plurality of relay nodes for the multicasted new bearer resource request message;

collating the responses received from the plurality of relay nodes;

admitting the user equipment to the long term evolution network based on the collated responses; and forwarding, upon admitting the user equipment, a response for the original bearer resource request as a S1 application part (S1-AP) message to the user equipment and the plurality of relay nodes.

4. The method of claim 1, wherein multicasting the new bearer resource request message comprises broadcasting the new bearer resource request message as a unicast message to each of the plurality of relay nodes.

5. The method of claim 1, wherein the plurality of relay nodes are tandem relay nodes serving the user equipment in a geographical area.

6. The method of claim 1, wherein the plurality of relay nodes comprises at least one evolved universal terrestrial radio access network (E-UTRAN) node B (eNB).

7. The method of claim 1, wherein the user equipment is a mobile device.

8. The system of claim 2, wherein the plurality of relay nodes are tandem relay nodes serving the user equipment in a geographical area.

9. The system of claim 2, wherein the plurality of relay nodes comprises an evolved universal terrestrial radio access network (E-UTRAN) node B (eNB).

10. The system of claim 2, wherein the user equipment is a mobile device.

11. The mobile management entity of claim 3, wherein the network is a long term evolution (LTE) network.

12. The mobile management entity of claim 3, wherein the plurality of relay nodes comprises an evolved universal terrestrial radio access network (E-UTRAN) node B (eNB).

13. The mobile management entity of claim 3, wherein the user equipment is a mobile device.

14. The mobile management entity of claim 3, wherein the user equipment is a wireless mobile device.

* * * * *